United States Patent [19]
Rolle

[11] 3,784,805
[45] Jan. 8, 1974

[54] SONAR IMAGE CONVERTER
[75] Inventor: Albert L. Rolle, Lynn Haven, Fla.
[73] Assignee: The United States of America as represented by the Secretary of the Navy, Washington, D.C.
[22] Filed: Oct. 4, 1972
[21] Appl. No.: 296,500

[52] U.S. Cl. ............... 340/3 R, 340/3 C, 340/5 MP, 340/8 S
[51] Int. Cl. ............................................. G01s 9/66
[58] Field of Search ................ 340/3 C, 3 R, 5 MP, 340/8 S

[56] References Cited
UNITED STATES PATENTS
3,543,229  11/1970  Baum .................................. 340/3 R
3,045,206  7/1962  Ahrens et al ........................ 340/3 R

*Primary Examiner*—Richard A. Farley
*Attorney*—Richard S. Sciascia, Don D. Doty and Harvey A. David

[57] ABSTRACT

A sonar system is disclosed as having a rotatable shaft with an electroacoustical transducer array mounted on one end thereof, a light output diode readout array mounted on the other end thereof, a receiver mounted on said shaft and connected between said transducer and readout arrays. A transmitter is also connected to said electroacoustical array. An electric motor rotates said shaft through a pair of gears, and a programmed function generator causes sonar target search and echo signals to be timely broadcast by said transmitter and received by said receiver during the rotation of said arrays. An objective lens views the outputs from the light diode output array and transmits it via a bundle of optical fibers to a pair of readout prisms located in a diver's face mask. With the exception of a large portion of the optical fibers and readout prisms, the entire sonar system may be encased in a waterproof housing to facilitate its being used as a visual aid to underwater swimmers and divers working in turbid water.

17 Claims, 8 Drawing Figures

PATENTED JAN 8 1974 3,784,805

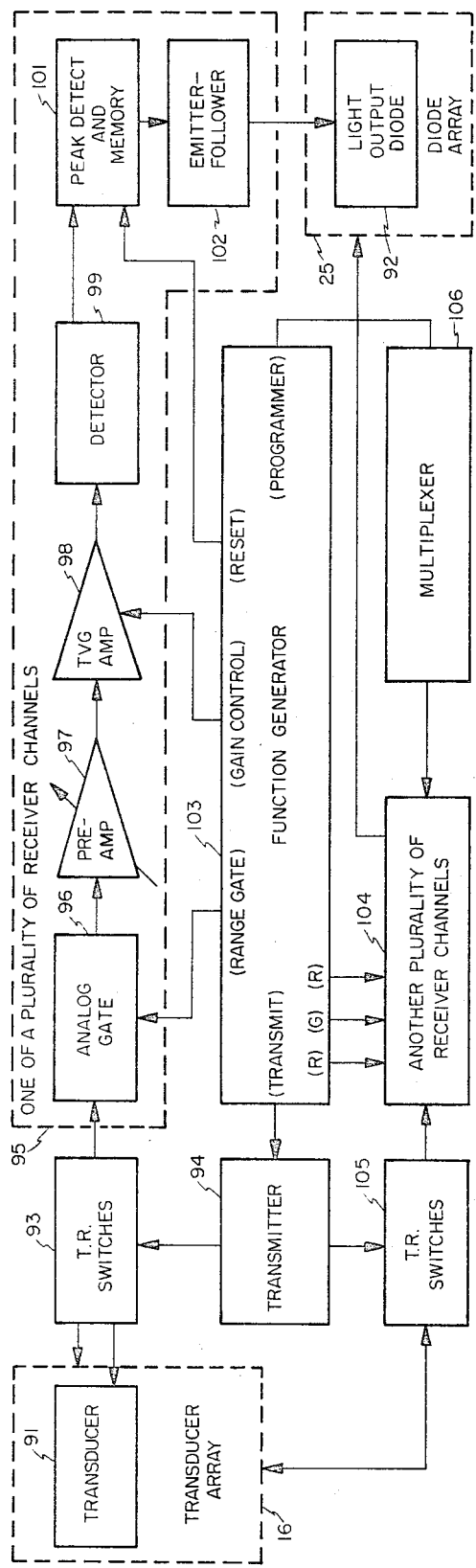
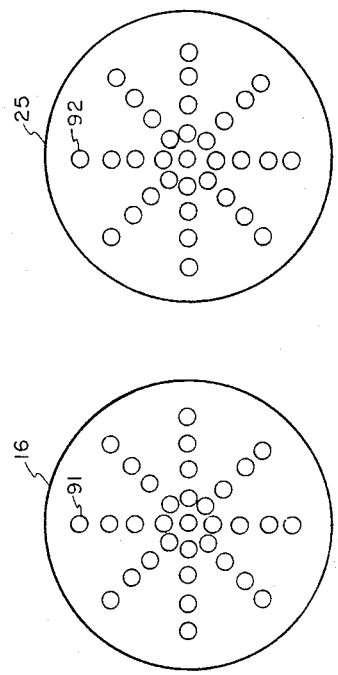
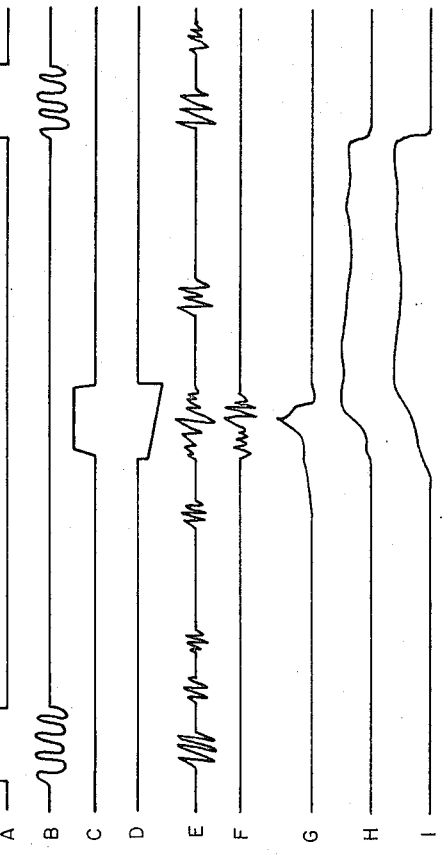

SONAR IMAGE CONVERTER

STATEMENT OF GOVERNMENT INTEREST

The invention described herein may be manufactured and used by or for the Government of the United States of America for governmental purposes without the payment of any royalties thereon or therefor.

FIELD OF THE INVENTION

In general, the present invention relates to echo-search-ranging systems, and, in particular, it is a sonar system that may be carried by a swimmer-diver to facilitate finding his way and for locating objects within water, even though said water may be somewhat turbid.

DESCRIPTION OF THE PRIOR ART

Heretofore, numerous sonar, radar, and other echo-search-ranging systems have beem employed as a means for facilitating the navigation of vehicles, as well as for locating objects in their respective environmental mediums. Moreover, various and sundry hand-held sonars have been used by swimmers and divers, in order to effectively allow them to "see" what is in front of them, as they move along under water.

For many practical purposes, the sonars of the prior art have been quite satisfactory; however, for the purpose of allowing human beings to actually see underwater objects with optimum visual capability, they, for the most part, leave a great deal to be desired. As a matter of fact, when observations are made thereby in water, sea water, or other liquids or fluids that are less than clear, it is ordinarily extremely difficult, if not impossible, for the swimmer-diver to discern what most acquired target objects are from the sonar readout only, inasmuch as the image resolution of such objects is generlly quite poor. In addition, those sonars of the prior art which do provide object image resolution to a degree that is useful to a human being are usually exceedingly complex, large in size and weight, require massive power supplies, and otherwise constitute an inordinant burden to the underwater swimmer-diver using them, both physically and economically. As a matter of fact, such burdens have been so great that, for most practical purposes, swimmer-divers have not been able to use them without vehicular support, thereby restricting their freedom of operation in many instances.

SUMMARY OF THE INVENTION

The subject invention is a new and unique sonar system which is uniquely combined with the face mask of a swimmer-diver in such manner that it actually augments the visibility of underwater objects to the human eye without interferring to any adverse extent with the normal vision thereof. Furthermore, the instant invention incorporates an improved image resolution technique which is implemented by a new combination of structural elements of relatively compact size that is easily ported and operated by a human swimmer-diver with very little training.

It is, therefore, an object of this invention to provide an improved echo-search-ranging system.

Another object of this invention is to provide an improved sonar system.

Still another object of this invention is to provide an improved method and means for augmenting the sight of an underwater swimmer-diver.

A further object of this invention is to provide an improved sonar system having an improved picture image readout of an acquired underwater object.

A further object of this invention is to provide an improved ultrasonic image converter.

Still another object of this invention is to provide a high definition ultrasonic sonar system that facilitates the acquiring and identification of various and sundry target objects within water, sea water, or any other suitable environmental medium, that may be employed as an aid to vehicle navigation and as a visual aid to swimmers and divers.

Another object of this invention is to provide an improved method and means for producing a television type view or readout of objects acquired at very short ranges — say, from 14 inches to about 10 feet — within a 60° field of view, so as to thereby improve the ability of swimmers and divers to do arms-length work — such as, for instance, making inspections, making repairs, performing rescues, and the like — on both large and small objects located within water, even though said water may be somewhat turbid.

Another object of this invention is to provide a sonar system that has improved signal-to-noise characteristics and an ability to resolve a weekly reflecting surface in the vicinity of a strongly reflecting surface, thereby effecting a more detailed image thereof.

Another object of this invention is to provide a high definition, short range, sonar device which will display television-like pictures inside a swimmer's face mask with a sixty degree field of view in front thereof.

Still another object of this invention is to provide an improved method and means effecting the scanning of sonar beams over a target area and for effecting the remote but synchronous display thereof.

Another object of this invention is to provide a rugged, reliable, simplified, high resolution, compact sonar system that is easily and economically manufactured, maintained, and operated.

Other objects and many of the attendant advantages will be readily appreciated as the subject invention becomes better understood by reference to the following detailed description, when considered in conjunction with the accompanying drawings.

BRIEF DESCRIPTION OF THE DRAWING

FIG. 3 is a front view of the reversible electroacoustical transducer array incorporated in the devices of FIGS. 1 and 2;

FIG. 4 is a rear view of the light emitting diode transducer array included in the devices of FIGS. 1 and 2;

FIG. 5 is a block diagram of one of a plurality of receiver channels incorporated in the electronic signal processing portion of the devices of FIGS. 1 and 2;

FIG. 7 is an idealized graphical representation of some of the signal waveforms emanating from the various and sundry components of the device of FIG. 5.

DESCRIPTION OF THE PREFERRED EMBODIMENT

Figure 1:
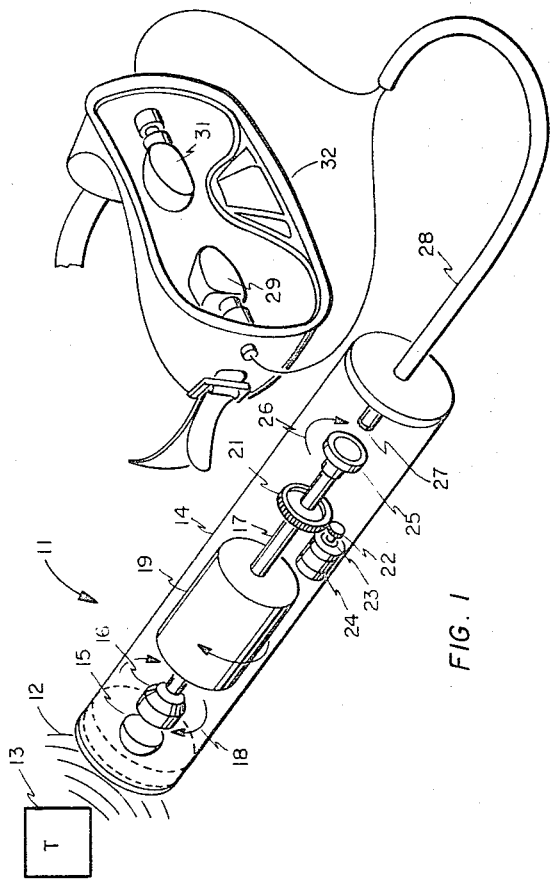
FIG. 1 is a schematic perspective view of the unique sonar and face mask readout combination of this invention.
Figure 2:
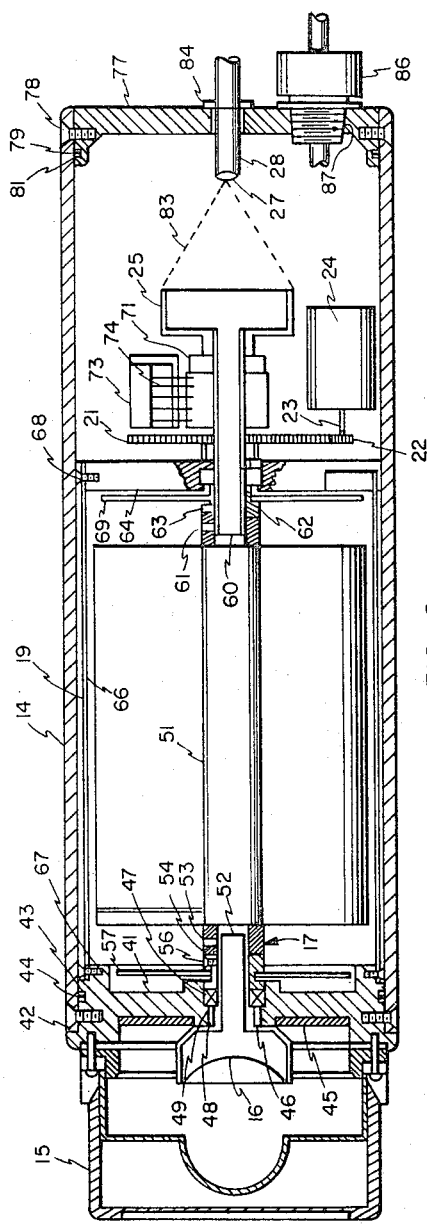
FIG. 2 is a partial cross-sectional view of the transceiver portion of the subject invention.

Referring now to FIGS. 1 and 2 but, at this time, primarily to FIG. 1, there is shown a sonar transceiver 11 which is receiving sonic energy 12 after it has been reflected from a target 13.

Sonar 11 includes a cylindrical housing 14, which has contained therein at the front end thereof an ultrasonic lens 15 which is spatially disposed from but in front of a transducer array 16 that is made up of a predetermined arrangement of reversible, electroacoustical, transducers which are suitable for both broadcasting and receiving acoustical energy within the ambient subaqueous or other environment in response to the broadcast and receiving modes of operation of the subject invention, respectively. As may readily be seen, transducer array 16 is mounted upon a rotatable shaft 17 and, thus, is thus rotatable, too, as indicated by arrows 18. Rotatable shaft 17 extends through a canister like housing 19 which is, likewise, attached thereto in such manner as to rotate therewith. In this particular embodiment, canister 19 houses the electronic circuitry of the sonar system constituting this invention, the circuitry of which will be discussed more fully subsequently. Shaft 17 also has mounted thereon a gear 21 which is adapted for being driven by a pinion 22 which, in turn, is mounted on a shaft 23 of a drive motor 24. At the end of shaft 17 opposite that containing the aforementioned electroacoustical transducer array is another transducer array 25 which, because it is fixedly connected thereto, is adapted for rotation therewith in accordance with the directivity indicated by arrows 26. In this particular instance, transducer 25 is, in fact, a readout type of transducer which includes a plurality of light output diodes that are arranged in a configuration which is substantially similar to that of the plurality of electroacoustical transducers incorporated in transducer array 16.

Spatially disposed from the aforesaid light diode array 25 is an objective lens 27, with the disposition thereof such that the field of view of the aforesaid light diode array 25 will be therewithin. Attached to the other side of objective lens 27 is a bundle of optical fibers 28 which has the other end thereof connected to a pair of conventional combining prism eye pieces 29 and 31 that are located in the field of view of a diver (not shown) when he is wearing a face mask 32.

At this time, it would appear to be noteworthy that any suitable optical fibers — such as, for example, glass or plastic fibers — may be employed which will transmit light energy from objective lens 27 to both eye pieces 29 and 31. However, it has been determined, that a bundle of 150,000 optical fibers is eminently satisfactory for such purpose. Moreover, it should be understood, that the optical fibers employed are connected in such manner that both eye pieces 29 and 31 receive the visual view received by the aforementioned objective lens 27.

Although, in this particular instance, a swimmer-diver's face shield 32 is shown as being the support means for combining prisms eye pieces 29 and 31, it should be understood that any other suitable support means, such as, for instance, a helmet, goggles, a console readout, or the like, may be substituted therefor without violating the spirit and scope of this invention. Obviously, it would be well within the purview of one skilled in the art having the benefit of the teachings presented herewith to select whatever readout means would optimize the use of the subject invention during any given operational circumstances. Hence, face mask 32 is shown as an example only and, thus, should not be considered as constituting a limitation on the subject invention.

The aforementioned sonar transceiver portion 11 of the invention is shown in much greater detail from a structural standpoint in FIG. 2. Generally speaking, the components referenced with respect to FIG. 1 have, likewise, been referenced by similar reference numerals, respectively, in the view thereof presented in FIG. 2, insofar as they are shown therein.

In this particular embodiment, lens 15 is shown as being a compound, temperature-compensated, liquid filled lens of the type specifically disclosed and claimed in patent application Ser. No. 241,602, entitled Acoustic Lens, by Albert L. Rolle, filed in the U. S. Pat. Office on Apr. 6, 1972. Of course, although the instantly disclosed lens may be considered as being a preferred embodiment of the type of lens that is used in the subject invention, it should be understood that lens 15 is not intended to be limited thereto. Accordingly, any other suitable lens may be substituted therefor, provided it performs the focusing functions necessary to the optimum operation of the subject invention.

In this particular embodiment, lens 15 is shown as being mounted on the open front end of housing 14 in such manner that light energy passing therethrough will be focused on the array of transducers 16 mounted on shaft 17.

In this particular embodiment, and as thus seen in FIG. 2, an end plate 41 is mounted within the front end of housing 14 by means of screws 42. For the purpose of waterproofing the connection between end plate 41 and housing 42, end plate 41 contains a groove 43 with an O-ring 44 inserted therein in such manner that it is urged against the inside surface of said cylindrical housing 14. For the purpose of reducing internal acoustical reflections, an anechoic substance 45 of any conventional type is mounted on the front surface of end plate 41 as by glueing or in such other manner as will cause it to adhere thereto. At the center of end plate 41 is an aperture 46 containing bearings 47 within which the aforementioned shaft 17 is mounted for rotation. An inner groove 48 is also disposed around the periphery of aperture 46, and an O-ring 49 is inserted therein and against shaft 17 in such manner that a watertight seal is provided thereat, even though a shaft 17 rotates thereagainst.

For purpose of ease of assembly and disassembly of the subject sonar, shaft 17 is actually made in sections with a center section 51 telescopically mounted on the front portion 52 thereof and is effectively connected thereto by means of set screws 53. In abutment with the front end of shaft section 51 and surrounding shaft section 52 is a forward thrust bearing 54 which is in abutment with the aforementioned bearing 47 and held in place on section 52 of shaft 17 by means of set screw 56. Mounted on thrust bearing 54 is an electrical shield disc 57, with said shield disc 57 being mounted thereon in such manner as to turn therewith.

Section 51 of shaft 17 extends rearwardly out of cylinder 19 and is telescopically mounted on a rearward section 60 of shaft 17 as by means of set screws 61. Rear thrust bearing 62 is likewise mounted on shaft section 60, as by set screw 63, so as to be connected for rotation therewith. A rear end plate 64 is also mounted within cylindrical housing 14 and is held in place by a plurality of beam-like braces 66. Of course, braces 66 connect to front end plate 41 by means of screws 67, and they are connected to said rear end plate 65 as by means of screws 68.

At this time, it might be well to note that forward end plate 41 and rearward end plate 64 have substantially spider-like configurations, when looking at the ends thereof. However, it should be understood that any other suitable configuration will be acceptable, as far as the spirit and scope of this invention is concerned.

Mounted on rear end thrust bushing 62 is another wire shield electrical disc 69 which, of course, is attached thereto as by press fit or any other conventional manner, so as to rotate therewith.

Mounted on rear section 60 of shaft 17 in any conventional manner for rotation therewith is the aforementioned driven gear 21 which, of course, is driven by drive gear 22 connected by means of shaft 23 to the aforesaid drive motor 24, as discussed previously in conjunction with the discussion of the device of FIG. 1. Also mounted on rear section 60 of shaft 17 is an armature 71 which is connected electrically through suitable holes within rear section 60 and center section 51 of shaft 17 to the various and sundry electronic components located within rotating cylinder 19 for the powering and driving thereof. Because such arrangement is conventional in transferring electrical energy to rotating parts, such electrical connections have not been specifically disclosed in FIG. 2. Nevertheless, it would obviously be well within the purview of one skilled in the art having the benefit of the teachings presented herewith to effect such electrical connections as are necessary for the proper operation of all electric and electronic components incorporated in the instant invention. Hence, for the purpose of simplifying this disclosure, said detailed power supplying and other electrical lines and wires have been omitted.

Mounted within cylindrical housing 14 by means of brackets 73 or the like, is a plurality of slip-rings 74 which are in slidable engagement with the aforementioned armature 71 as necessary to supply electrical energy to the respective components thereof.

At the rear extremity of rear section 60 of shaft 17 is mounted the aforementioned light emitting diode array 25. Of course, said array 25 may be connected to rear shaft section 60 in any conventional manner, such as by set screws 75 or the like, and furthermore, the individual light diodes of light emitting diode transducer array 25 are electrically connected by means of electrical wires or leads through the hollows of rear section 60 and center section 51 and suitable apertures located therein (not shown) to the various and sundry electronic components associated therewith and located within the aforementioned rotating cylinder 19, as will be disclosed and discussed in some greater detail subsequently in conjunction with the discussion of FIG. 5.

At the rear extremity of cylindrical housing 14 is an end plate 77 which is connected thereto as by means of screws 78. To provide watertight sealing between set-in plate 77 and the inside surface of housing 14 an O-ring 79 is located in a groove 81 disposed around the periphery of end plate 77. Of course, the resilient urging of O-ring 79 against end plate 77 and housing 14 affects said watertight seal therebetween.

Located within an aperture 82 located in the center of rear end plate 77 and in alignment with the center of the aforementioned light emitting diode array 25 is the aforesaid bundle of fiber optics 28. Of course, as previously indicated on the front end of said bundle of fiber optics 28 is an objective lens 27 which has a field of view defined by imaginary cone 83 which, as may readily be seen, is broadened at the base thereof to sufficiently encompass the entire rear face of light emitting diode transducer array 25. Because optical fibers 28 extend through rear wall 77, a watertight seal must be provided therebetween. Accordingly, a suitable packing gland 84 is inserted therebetween in any conventional manner.

Another packing gland 86 is inserted within hole 87 likewise located through the wall of rear end plate 77 for providing a watertight seal therebetween and, yet, allow the passage of electrical wire or leads therethrough in such manner that they may be connected to the aforementioned drive motor 24 and slip-ring 74 for supplying electrical power thereto, respectively, from some externally located electrical power supply and controls therefor probably located in the back pack of a diver (likewise not shown).

At this time, it would appear to be noteworthy to mention that the sonar device located within cylindrical housing 14 may be of any size that is necessary to perform the operations desired. Therefore, it may be of such external dimension as would allow it to be held by the hand of a swimmer-diver who is probing the water or sea water which is turbid or in such condition otherwise as would require a visual aid in order for said diver to navigate and perform any work which he wants to do. On the other hand, it may also be of such dimension as would facilitate it being mounted on any suitable underwater vehicle or, for that matter, on any other type of device located in any appropriate environmental medium within which sonar-like operations can be used to an advantage. Again, it would obviously be well within the purview of the artisan to design the subject invention in its entirety in such manner that it may be used in conjunction with a human being or manned or unmanned vehicles or the like for any suitable purpose within water, air, space, or any other appropriate environmental medium.

Referring now to FIG. 3, there is shown a front view of the electroacoustical transducer array previously designated in FIGS. 1 and 2 as transducer array 16. In this particular instance, transducer array 16 is shown schematically as having a predetermined geometrical configuration of individual electroacoustical transducer elements 91. Although the pattern shown in FIG. 3 is found to be optimum, it should be understood that any other pattern of transducer elements 91 may be employed if warranted by operational circumstances.

FIG. 4 discloses a rear view of the aforementioned light emitting diode transmitter array 25 as including a plurality of light emitting diodes 92 arranged in a pattern which corresponds, respectively, to their counterparts, that is, to electroacoustical transducer elements 91 in transducer array 16 of FIG. 3. Again, like the array pattern of FIG. 3, the array pattern of light emitting diodes 92 may be such as would optimize the operation of the entire invention during any given circumstances. However, as a general rule, the pattern of light emitting diodes 92 will be similar to the pattern of electroacoustical transducer elements 91, inasmuch as such an arrangement appears to optimize the transfer of energy therebetween and between their respective associated objects or elements.

Referring now to FIG. 5, there is shown the aforementioned transducer array 16 as including an electroacoustical transducer 91 as one of the components thereof. The output of transducer 91 in this particular instance constitutes one of the outputs of transducer array 16 and is connected to the input-output of one of transmit-receiver (TR) switches 93. Another of the inputs of transmit-receive switches 93 is connected to the output of a transmitter 94, and one of the outputs of transmit-receive switches 93 is connected to the input, in this particular example, of one of the receiver channels 95 of a predetermined number of receiver channels, the number of which is determined by the number of electroacoustical transducer elements located in transducer array 16 and the number of light output diodes located in diode array 25. Because all of the receiver channels are substantially identical, only one thereof is shown herewith, in order to keep this disclosure as simple as possible.

At this time, it would perhaps be noteworthy that the aforementioned transducer 91, TR switch 93, transmitter 94, and receiver channel 95 are combined in the conventional manner, so as to prevent cross-talk from occurring between the transmitter and receivers — that is, so as to prevent reception from occurring during the mode of transmission and to prevent transmission from occurring during the mode of reception.

The input to receiver channel 95 is, in this case, the data signal input to an analog gate 96. The output of analog gate 96 is connected to the input of a variable gain preamplifier 97, the output of which is connected to the input of a tuned time-varied-gain amplifier 98. The output of tuned time-varied-gain amplifier 98 is connected through a detector 99 to the data signal input of a peak detector and memory circuit 101. The output of peak detector and memory circuit 101 is connected to the input of a circuit isolation emitter-follower 102, the output of which is connected to the input of light output diode 92 of diode transducer array 25. The aforementioned analog gate 96 has a range gate pulse input, the aforementioned tuned time-varied-gain amplifier 98 has a gain control voltage input, and peak detector and memory circuit 101 has a reset pulse input, all of which are respectively connected to one of the range gate outputs, one of the gain control voltage outputs, and one of the reset pulse outputs of a function generator 103. Likewise, transmitter 94 is connected to transmit pulse output of function generator 103.

Because there is usually several pluralities of receiver channels included in the operational design of the subject sonar, another plurality of receiver channels 104 is disclosed. Also, in such case, another plurality of transmit-receive switches 105 is shown as being conventionally connected to receiver channels 104, transmitter 94, and transducer array 16. A multiplexer 106 is, moreover, connected between the programmer output of the aforesaid function generator 103 and the gating inputs of receiver channels 104 for the timely activation thereof. Hence, one or more of the receiver channels of this invention may be operative at any given instant.

At this time, it would perhaps be noteworthy that all of the elements disclosed in FIG. 5 are well known, conventional, and commercially available, per se, and, hence, it should be understood that it is their unique interconnections and interactions which consititute new and improved receiver channel portions of the subject invention and which make an important contribution to the improved operation produced thereby.

Figure 6:
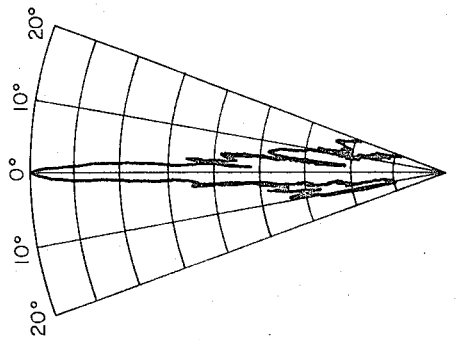
FIG. 6 is a graphical representation of a typical broadcast or receiving directivity pattern produced by the subject invention for any given fixed focal length.
Figure 8:
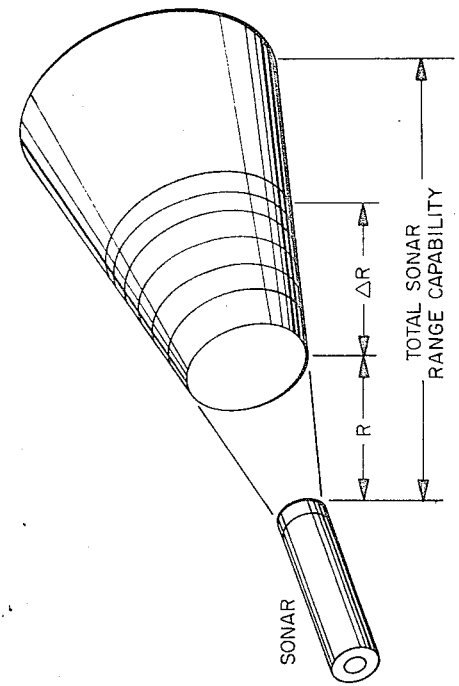
FIG. 8 is a schematic perspective diagram that illustrates the advancing incremental range gating which is effected during the normal operation of the subject invention.

FIGS. 6, 7, and 8 are not structural in nature and, thus, will not be discussed in detail at this time; however, they will be discussed during the discussion of the mode of operation which follows.

MODE OF OPERATION

The operation of the subject invention will now be discussed briefly in conjunction with all of the figures of the drawing.

The high definition sonar constituting this invention is actually an ultrasonic image converter which displays a television-like picture inside the face mask of a predetermined viewing sector located immediately in front of the diver wearing the face mask. As the diver travels along his underwater course, he causes the subject sonar system to broadcast sonic energy throughout the ambient environment medium in accordance with a radiation pattern which is typically shown in FIG. 6. Such broadcast, of course, is actually implemented by transmitter 94 energizing all of the transducer elements of transducer array 16 being rotated as a result of motor 24 effectively during shaft 17 through shaft 23, drive gear 22, and driven gear 21. In effect, such rotation of transducer array 16 effects the acquiring of target 13 with a plurality of sonar beams which are reflected therefrom back to transducer array 16 for reception thereof during the received mode of operation of the sonar. Again, rotating transducer array 16 during the received mode of operation effects the scanning of the aforesaid plurality of sonar beams over the target area and, thus, receives those which are reflected back from the target as a high definition image thereof.

As a general rule, the fundamental problem in finding high definition sonar images is the occurrence of low level returns from a large portion of a target's surface. Even at relatively high operating frequencies, such reflections from typical surfaces are predominantly specular in nature. Therefore, from a large portion of the target surface, the echo level may be inadequate for processing because the majority of the sound energy may have been reflected away from the receiver, rather than directly toward it. When the specular component of said echo signal is in the direction of the receiver, the echo level is, of course, very high. It has been found that the range between the low-level and the high-level echoes from a typical target surface may theoretically be as great as 80 db. Consequently, as may readily be seen, the target resolution can be improved considerably if the echoes therefrom can be effectively concentrated at its reception point. For this reason, in order to operate effectively with specularly reflecting surfaces, the subject sonar system uses the same transducer elements to both project and receive the broadcast and target reflected sonic energy. For purposes of optimization, the plurality of electroacoustical transducer elements should be spaced in such manner that adjacent beams that are activated during a particular pulse overlap at the minus 50 db points of the composite patterns. As a result of so doing, higher source levels can be obtained, compared to a broad beamed insonifier with the same power, thereby effectively increasing the proportion of a target's surface from which the received echoes will be above the noise, and, hence, improving the signal-to-noise ratio. Also, the greater isolation acquired between the sonar beams of the instant invention improves its ability to resolve a weekly reflecting surface signal in the vicinity of a strongly reflecting surface signal and, thus, forms a more detailed image.

During the transmission mode of operation, the transducer elements should be driven at the maximum peak power level, in order to increase the proportion of a target's surface from which the echo is above the noise. In this particular case, in order to deal effectively with the target return signals from those portions of the target that reflect the specular component directly toward the receiver, the transducer array and all of the post transducer electronic circuitry associated therewith should be designed to preserve as high a db isolation attainment as possible between sonar beams. Insonifying a total target area, as a general rule, compounds the specularity problem because every resolvable point of target surface contributes to the apparent pressure amplitude at the receiver; however, by insonifying only a small fraction of the target surface at any given instant in the manner effected by this invention causes the possible number of interferring reflectors to be reduced considerably.

A very important factor in causing the instant device to produce a high definition target image is the fact that both the electroacoustical transducer array and the light output diode array are synchronously rotated at such a speed as to cause the beam of the transducer elements furtherest from the axis of rotation to move to no more than one beam width of the one-way pattern in a period corresponding to the two-way pulse travel time for the longest range. Therefore, it may readily be seen that particular target range corresponds to a particular rotational rpm, and because the array is symmetrical about the center of rotation, two complete pictures are formed for each revolution. Thus, by selecting the proper rotation speed, the frame rate may be made sufficiently high to prevent undue flicker in the display.

Because the elements of the electroacoustical transducer array nearer the axis of rotation are moved through a smaller arc than the outer elements for the same angular displacement, the outputs of these inner elements during the receiving mode of operation are preferable multiplexed to reduce the number of required signal processing channels required. As would be obvious to the artisan having the benefit of the teachings presented herewith, such multiplexing could be effected by causing the outer elements of transducer array 16 to be sensed continuously, with half of the intermediate elements thereof sensed with every projected pulse, and with only one-third of the inner elements thereof sampled every transmitted pulse. By using such arrangement, a lesser number of channels is required for any given number of individual transducer elements located within the broadcasting and receiving transducer array 16. Consequently, depending upon the multiplexing arrangement selected, the number of channels employed in the instant invention becomes a matter of design choice, the making of which would be well within the purview of one skilled in the art.

As may readily be seen from FIG. 2, the degree of concentration of target echoes received by a transducer array 16 is contingent upon the focusing power of acoustic lens 15 disposed in front thereof. Although the aforementioned lens 15 is herewith disclosed as being a particular liquid acoustic lens believed to be of patentable significance in its own right, it should be understood that other liquid or solid acoustic lenses may be substituted therefor, so long as they properly accomplish the desired acoustic energy focusing effect upon transducer array 16.

During the receiving mode of operation, the received echo signals from an acquired target will be processed in all of the receiver channels in the same manner. Therefore, in order to keep this disclosure as simple as possible, the processing thereof through only one channel, namely receiver channel 95, will be discussed in detail herewith. In this particular case, the X and Y coordinates of the light output diode array display enhance in the display within eye pieces 29 and 31 and represent a bearing and inclination, respectively, rather than bearing and range, as is found in the more conventional sonars. Because of the time-varied-gain employed to increase the receiver's dynamic range and the specular nature of the reflected sound, range is not directly discernible from the display. Hence, the signal processing of the instant invention is based on the premise that, from a particular direction, the signal of major interest is the highest level echo. A peak detector and memory circuit at the output of the envelope detector is therefore employed to store the level of the strongest echo for a period of time that is inversely proportional to the range of the target or for some minimum time, as desired. This pulse-stretching process increases the average display intensity and allows direct viewing of the light output diode display with short projected or transmitted pulses.

Variable-width range gating is provided by analog gate 96 (which is, electrically speaking, located prior to preamplifier 97) and tuned time-varied-gain amplifier 98. The objective of the range gating is to provide some indication of target range and to attain a "shadowgraph" effect for difficult target-background situations. For example, by automatically stepping in range as shown in some detail in FIG. 8, a small target object attached to a larger target object may first appear as a bright spot on a dark background and then as a dark spot on a brighter background, as the gate moves out in range. This effect, when properly employed, will increase the probability of detection and classification of objects or target features that may ordinarily tend to blend into their ambient background.

A rotating receiving array was selected because of its simplicity, low component count, and large area available for spacing the elements for increased acoustic isolation between beams. The rotating light output diode array as a type of display is employed because it is compatible with the rotational scanning of the electroacoustical transducer receiving array. The major advantages of the two rotating arrays are that they display scanning electronics and the related multiplexing of the envelope detector outputs, they eliminate multiple high voltages and dc to dc converters, and they provide a pulsed high intensity output for a small power drive per light output diode in the diode array. In addition, the display volume is less than one-tenth of that which would be required if, for example, a cathode-ray tube were used as the readout and, moreover, the reliability and operating life are increased significantly.

On the other hand in the event it is found to be objectionable to have some flicker in the display of the subject invention, it may be substantially eliminated or at least reduced by optionally placing an image intensifier tube between the light output diode array and the observer. With a phosphor of the proper persistency and an accelerating potential high enough, the light output should be comparable to an applicable miniature cathode ray tube. Such apparatus has been demonstrated to suppress flicker sufficiently to enable the overall sonar system to perform adequately in those situations in which flicker cannot be tolerated. However, in most instances, the amount of flicker involved during the normal operation of the diode array embodiment would be negligible.

As a general rule, a swimmer's forward speed is typically less than one-half knot or about ten inches per second. For this speed, the target image quality and fidelity is adequate for most practical purposes. As a matter of fact, it provides a considerable visual aid to the diver not obtainable by any other known method or means without any inconvenience thereto.

In the foregoing, a general discussion was presented relative to the overall operation of the subject invention. Now, in order to more clearly explain the internal operations of the electronic portion of the invention, the device of FIG. 5 will be discussed in conjunction with the signal wave forms presented in FIG. 7. Again, it should be understood, that FIG. 5 only presents a single channel portion of a multichannel system constituting this invention, the channels of which may be multiplexed as mentioned previously.

In accordance with a gating signal of the type comparable to that shown in FIG. 7A, transmitter 94 is turned on and causes transducer 91 to broadcast a CW type pulse signal similar to that shown in FIG. 7B. Of course, said broadcast CW pulse is actually a search signal which upon impact with an underwater target is reflected therefrom as an echo signal. In accordance with the program set forth in the function generator range gate pulses of the type depicted in FIG. 7C timely open normally closed analog gate 96, so as to allow the aforesaid target echo signals to pass therethrough in the event the target from which they are reflected have a range which coincides with the range programmed at that particular instant by the range gate pulse from function generator 103. As shown in FIG. 8, of course, the subject sonar system has a total range capability; however, because range gating is employed therein, various and sundry range segments – depicted as the segments located between the distances ΔR in FIG. 8 – target objects are searched at and are indicated as being acquired at a particular range distance. Hence, if the received target echo is supplied to the input of analog gate 96 at the time it is opened by the range gate pulse of FIG. 7C, it passes therethrough as being from some particular target range, whereupon it is amplified by preamplifier 97 to a more useful level. In order to then improve the fidelity of the target echo signal it is further processed by tuned time-varied-gain amplifier 98 as is conventional in such amplifiers when a large number of target ranges are encountered. In order to effect the proper amplification by tuned time-varied-gain amplifier 98, gain control signals of the type exemplarily depicted in FIG. 7D are supplied to the control input thereof. As a result of the aforementioned range gating and time-varied-gain amplification, the target echo signals such as that portrayed in FIG. 7E, are passed through both thereof at the time that analog gate 96 is open, thereby eliminating all other signals that may be received and clearly producing the acquired target signals in the manner exemplarily illustrated in FIG. 7F. By comparing the signal waveform of signal FIG. 7E and the signal of FIG. 7F, it may readily be seen that the aforementioned procedure substantially deletes all spurious signals for the disclosed particular range when analog gate 96 is open. When the signal of FIG. 7F is detected by detector 99, it becomes a signal having a waveform comparable to that shown in FIG. 7G, and when the peak thereof is detected and stored in peak detector and memory 101, the resulting signal becomes similar to that illustrated in FIG. 7H. For circuit isolation purposes, in order to delete as much of the spurious noise encountered as possible, the output from peak detector memory 101 is passed through emitter-follower 102 before it is supplied to light output diode 92 in diode array 25 as the signal ideally illustrated in FIG. 7I.

As may readily be seen from inspection of FIGS. 7H and 7I, peak detector and memory 101 are reset by the reset pulse supplied to the reset input thereof from function generator 103 at approximately the time that the next search signal is broadcast by transmitter 94 and transducer 91. Accordingly, the memory portion of peak detector and memory 101 stores the signal processed thereby for the period of time between the received target signal is detected by detector 99 and the next search signal is broadcast. Of course, the signal of FIG. 7I is that which is supplied to light diode 92 which turns it on for the period of time said signal is positive in polarity.

From the foregoing, it may readily be seen that the broadcast of a search signal, the reception of a target echo thereof, and the processing through a receiver channel causes a light display to occur in the light diode array. Of course, such signal performance and processing timely occurs in each of the channels in substantially the same manner as just described in connection with receiver channel 95 of FIG. 5. When all channels are operative, those light output diodes are energized as light dots on the array display, and the configuration thereof which is lighted at any given instant functions to effect a picture-like image of the target acquired.

As previously indicted, the proper multiplexing of receiver channels will, as a general rule, optimize target image fidelity for any given operational circumstances. For example, it has been found that good results occur if thirty-one transducers and 22 receiver channels are incorporated in the invention, with multiplexing thereof programmed in such manner that sixteen transducers perform full time, six transducers perform one-half of the time, and nine transducers perform one-third of the time. Of course, other timing arrangements of the transducer and channel combinations may be employed, if so desired. Obviously, it would be well within the purview of one skilled in the art having the benefit of the teachings presented herewith to design the multiplexer and its program in such manner as to provide any multiplexing system required during any given operational circumstances.

As may best be seen in FIG. 2, whatever light diode picture-like image is portrayed by diode array 25 is received by objective lens 27 which, in turn, focuses it on the ends of the 180,000 fiber optic bundle, where it is conducted therein to the eye pieces 29 and 31 located in mask 32, where it becomes an important visual aid to the diver wearing said mask.

Again, for purposes of emphasis, because it is exceedingly important to the optimum operation of the subject invention, attention is directed to the fact that shaft 17, transmitting and receiving electroacoustical transducer 16, light diode readout array 25, and the signal processing electronics connected therebetween are simultaneously rotated — and, thus, rotated in synchronism — during the broadcast of target search signals and the reception of echo signals therefrom. Such operation causes the subject sonar to produce high fidelity, picture-like, target object images not obtainable in any other known way. Of course, such improved results occur because, during the broadcast mode, the search signals scan the acquired target along concentrated small path areas thereon, rather than insonifying the entire target at once. Hence, the echo signals reflected therefrom are likewise concentrated over a small area at any given instant, thereby improving the strength and quality thereof. Moreover, such concentrated scanning search and echo signals tend to stand out against whatever contiguous spurious target reflections or ambient environmental medium noise signals may be present in the target area. As a result, when the concentrated scanning thereof is properly processed and synchronously readout or displayed by appropriate transducers, the image of an acquired target is enhanced considerably, and is especially valuable for provding a visual aid to swimmers and divers doing work within a turbid subaqueous environment.

From the foregoing it may readily be seen that the subject invention constitutes a new and unique combination of well known and conventional individual elements which produces results as far as target resolution is concerned which are vastly improved over those obtained by known sonar systems and thus, it ostensively constitutes an advancement of considerable significance in the sonar art.

Obviously, other embodiments and modifications of the subject invention will readily come to the mind of one skilled in the art having the benefit of the teachings presented in the foregoing description and the drawings. It is, therefore, to be understood that this invention is not to be limited thereto and that said modifications and embodiments are intended to be included within the scope of the appended claims.

What is claimed is:

1. A sonar system, comprising in combination:
   a rotatable shaft;
   a plurality of reversible electroacoustical transducers disposed in an array having a predetermined pattern mounted on one end of said rotatable shaft;
   a plurality of light output diodes disposed in an array having a pattern substantially similar to array pattern of the aforesaid plurality of reversible electroacoustical transducers, respectively, mounted on the other end of said shaft;
   means effectively connected to the inputs of said plurality of reversible electroacoustical transducers for the timely energization thereof, respectively, mounted on said rotatable shaft;
   a receiver means having a plurality of receiving channels with the inputs thereof respectively effectively connected to the outputs of predetermined ones of said plurality of reversible electroacoustical transducers and with the outputs thereof respectively connected to the inputs of predetermined ones of said plurality of light output diodes mounted on said rotatable shaft;
   function generator means connected to the aforesaid reversible electroacoustical transducer energizing means and said receiver means for effecting the broadcasting and receiving of predetermined signals thereby in accordance with predetermined programs, respectively; and
   means connected to said rotatable shaft for effecting the rotation thereof while the aforesaid predetermined signals are being broadcast and received.

2. The device of claim 1, wherein said means effectively connected to the inputs of said plurality of reversible electroacoustical transducers for the timely energization thereof, respectively, mounted on said rotatable shaft comprises a transmitter.

3. The device of claim 1 wherein each of the receiving channels of said receiving means comprises:
   an analog gate having a data signal input effectively connected to one of the reversible electroacoustical transducers of the aforesaid array thereof and a control input adapted for the opening thereof in response to a range gate pulse signal;
   a tuned time-varied-gain amplifier having a data signal input and a gain control voltage signal input, with the data signal input thereof effectively connected to the output of said analog gate;
   a detector connected to the output of said tuned time-varied-gain amplifier;
   a peak detector and memory having a data signal input and a reset pulse input, with the data signal input thereof connected to the output of said detector; and
   an emitter-follower connected between the output of said peak detector and memory and one of the aforesaid light output diodes of the array thereof.

4. The device of claim 1, wherein said means connected to the aforesaid reversible electroacoustical transducer energizing means and said receiver means for effecting the broadcasting and receiving of predetermined signals thereby in accordance with predetermined programs comprises a programmed function generator which timely produces transmitter gating signals, range gate pulses, gain control voltage signals, and reset pulses.

5. The device of claim 1, wherein said means connected to said rotatable shaft for effecting the rotation thereof while the aforesaid predetermined signals are being broadcast and received comprises:
   a driven gear connected to said rotatable shaft;
   a drive gear disposed for driving engagement with said driven gear; and
   a motor having a rotatable shaft connected to said dirve gear.

6. The invention of claim 1, further characterized by a plurality of transmit-receive switches connected between said plurality of reversible electroacoustical transducers, said energization means therefor, and the aforesaid receiver means, respectively.

7. The invention of claim 1, further characterized by:

an objective lens spatially disposed from said light output diode array in such manner as to have said light output diode array in the field of view thereof;
a readout; and
means connected between the optical output of said lens and the optical input of said readout for transmitting images formed by the former to the latter.

8. The invention of claim 1, further characterized by:
an objective lens spatially disposed from said light output diode array in such manner as to have the light output thereof focused at a predetermined spot thereby;
a pair of combining prism eye pieces for presenting visual images of objects; and
a bundle of optical fibers connected between the focal spot of said objective lens and the optical inputs of said pair of combining prism eye pieces.

9. The invention of claim 1, further characterized by:
an objective lens spatially disposed from said light output diode array in such manner as to have said light output diode array in the field of view thereof;
a diver's face mask;
a pair of combining prism eye pieces respectively mounted within said diver's face mask in such manner as to be in alignment with and in front of the eyes of a diver wearing said face mask; and
a bundle of optical fibers connected between the optical output of said objective lens and the optical inputs of said pair of combining prism eye pieces.

10. The invention of claim 1, further characterized by a waterproof housing encasing said sonar system.

11. The invention of claim 1, further characterized by:
another plurality of receiver channels having a plurality of inputs and outputs, with predetermined ones of the inputs thereof connected to predetermined ones of the outputs of said function generator means, and with the outputs thereof connected to predetermined ones of said plurality of light output diodes, respectively; and
a like plurality of transmit-receive switches connected between predetermined ones of said plurality of reversible electroacoustical transducers, said energization means, and predetermined inputs of the aforesaid plurality of receiver channels, respectively.

12. The invention of claim 11, further characterized by means connected between a predetermined output of said function generator means and predetermined inputs of said another plurality of receiving channels for effecting the multiplexing thereof in accordance with a predetermined program.

13. The invention of claim 1, further characterized by an acoustic lens means spatially disposed from said plurality of reversible electroacoustical transducers in such manner as to be located in the operative fields of projection and reception of the acoustical energy timely broadcast and received thereby.

14. A sonar system, comprising in combination:
a reversible electroacoustical transducer for broadcasting and receiving acoustical energy in accordance with a predetermined directivity pattern;
a transmitter effectively connected to the output of said reversible electroacoustical transducer for the timely energization thereof;
a receiver effectively connected to the output of said reversible electroacoustical transducer;
a light output diode connected to the output of said receiver and disposed in such manner as to shine its light energy in accordance with a predetermined directivity pattern;
an objective lens spatially disposed from said light output diode in such manner that the predetermined directivity pattern of the light energy therefrom is located within the field of view thereof;
function generator means connected to the aforesaid transmitter and receiver for timely effecting the transmission and reception thereof in accordance with predetermined operational programs, respectively; and
means connected to the aforesaid reversible electroacoustical transducer, to said transmitter, to said receiver, to said function generator means, and to said light output diode for effecting the simultaneous rotation thereof about a common axis.

15. The invention of claim 14, further characterized by means effectively connected to the output of said objective lens for conducting light energy transmitted therethrough to a predetermined location remote therefrom.

16. The invention of claim 15, further characterized by a readout connected to the remote output of said light conducting means for displaying the light energy conducted thereby.

17. The invention of claim 14, further characterized by an acoustic lens means spatially disposed from said reversible electroacoustical transducer in such manner as to be located in the operative fields of projection and reception of the acoustical energy timely broadcast and received thereby.

* * * * *